(12) United States Patent
Haberkorn et al.

(10) Patent No.: US 8,280,848 B2
(45) Date of Patent: Oct. 2, 2012

(54) AUTOMATIC COMPARISON OF ROAMING DATA OR ROUTING DATA

(75) Inventors: Guenter Haberkorn, Birgland/Schwend (DE); Fridtjof Van Den Berge, Bonn (DE); Alexander Gabler, Bonn (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 12/988,320

(22) PCT Filed: Jun. 2, 2009

(86) PCT No.: PCT/EP2009/003913
§ 371 (c)(1),
(2), (4) Date: Jan. 8, 2011

(87) PCT Pub. No.: WO2010/012332
PCT Pub. Date: Feb. 4, 2010

(65) Prior Publication Data
US 2011/0131182 A1    Jun. 2, 2011

(30) Foreign Application Priority Data
Jul. 29, 2008   (DE) .......................... 10 2008 035 392

(51) Int. Cl.
G06F 7/00      (2006.01)
G06F 17/00     (2006.01)
G06F 15/16     (2006.01)

(52) U.S. Cl. .......................... 707/617; 707/634; 707/922

(58) Field of Classification Search .................. 707/617, 707/634, 922
See application file for complete search history.

(56) References Cited

U.S. PATENT DOCUMENTS

| | | | | |
|---|---|---|---|---|
| 6,731,932 | B1 * | 5/2004 | Rune et al. | 455/432.1 |
| 7,133,670 | B1 * | 11/2006 | Moll et al. | 455/432.1 |
| 7,310,511 | B2 | 12/2007 | Barnea | |
| 2005/0186939 | A1 * | 8/2005 | Barnea et al. | 455/432.1 |

* cited by examiner

Primary Examiner — Greta Robinson
Assistant Examiner — Brian E. Weinrich
(74) Attorney, Agent, or Firm — Andrew Wilford

(57) ABSTRACT

International-roaming-relevant data are exchanged between two roaming partner networks as part of a new communication relationship. From the start of this communication relationship, a logbook is maintained at least on the data-processing system of the first communication network in which logbook changes are entered that relate to the content of the local database. Based on entries in the logbook, the data-processing system recognizes in completely automatic fashion that a synchronization of data is required and implements this action between the internal network operator database and the data-processing system of the second communication network.

16 Claims, 4 Drawing Sheets

AUTOMATIC COMPARISON OF ROAMING DATA OR ROUTING DATA

CROSS REFERENCE TO RELATED APPLICATIONS

This application is the US national stage of PCT application PCT/EP2009/003913, filed 2 Jun. 2009, published 4 Feb. 2010 as 2010/012332, and claiming the priority of German patent application 102008035392.2 itself filed 29 Jul. 2008, whose entire disclosures are herewith incorporated by reference.

FIELD OF THE INVENTION

The invention relates to a method of synchronizing network data, in particular roaming and/or routing data, between at least first and second databases, the first database being connected to a first data-processing system associated with a first communication network, the second database being connected to a second data-processing system associated with a second communication network, the first and the second data-processing systems being connected to each other by a communication link, the first database storing network data held in data records and suitable for synchronization with the second database. The invention furthermore relates to a computer program and a communication system for carrying out the method.

BACKGROUND OF THE INVENTION

In order to exchange connection data and signaling data unique identifiers are required that define the routing paths and the communication authorizations between the communication networks. These communication networks are differentiated in terms of three network types:
  voice network
  signaling network
  data network In the field of mobile radio communication, information for routing, for example voice, data, and control signals are on file in an international, standardized document (IR.21) and contain for example so-called roaming and/or routing data. This includes, for example the following network-specific data:
  E.164 (Global Title)
  E.214 (Mobile Global Title)
  E.212 (Mobile Country Code, Mobile Network Code)
  MSRN formats (Mobile Subscriber Roaming Number)
  MSISDN formats (Mobile Subscriber Integrated Services Digital Network Number)
  SMS/MMS service center information
  IP address for network elements
  GPRS information (General Packet Radio Service)
  GRX routing information (GPRS roaming exchange)
  CAP versions (CAMEL Application Protocol)
  routing information
  Global Title of the network elements
  formats of the MSISDN Message-based communication between two communication networks is effected through so-called routing data, where the target network element is essentially addressed through
  Country-/Network-Destination-Code (CC+NDC)
  Mobile Country-/Mobile Network-Code or
  IP addresses or ranges with associated AS number.

Routing data identify the different communication paths, for example in order to specify paths within a mobile radio communication network, a cable-based fixed network, an IP-(Internet protocol)-based network such as the Internet, or to specify a satellite communication. Roaming data essentially function to enable a communication link between two communication networks. Both types of information are stored in a local database of the network operator and are also made known in the network elements of the network operator. These data are essentially required in any type of cross-network communication, i.e. in communication from a first communication network to a second communication network. Each of the two communication networks here can be either a fixed network or also a mobile radio network.

Currently, updates to roaming and routing data in the databases of the network operators does not occur on a daily basis. Instead, there are backlogs in the completion of data that can extend over several weeks. This essentially results from the fact that a wide variety of data types must be taken into account for international roaming, and the responsibilities for supplying these types of data are spread across several different departments of a network operator. In some cases, data must be modified by other network operators in order to avoid overlaps in the various data records.

Since cross-network communication must take into account data that constantly change, i.e. what are known as dynamic data, also called delta data—for example services like post-paid, pre-paid and IP roaming—the fact that database content is not updated on a daily basis is really not acceptable for the external network operators. Any delta data, i.e. data relating to a specific network operator that change and have changed, are stored in a document on a server of the GSMA (Global Systems for Mobile Communications Association) in Dublin, this document being identified as the IR.21 document. Such storage is undertaken by the network operator on an optional (not obligatory) basis.

The documents stored on the GSMA server are generated manually. The delta data entered there come from different departments and are in turn incorporated by other departments in the above-mentioned media. After modification, i.e. after an update, the IR.21 document is sent by e-mail to all network operators of other mobile radio networks. This occurs either through the GSMA server or is done manually by the relevant network operator. The IR.21 document is a Microsoft® Word or Microsoft® is Excel® document in which the delta data are recorded.

The problematic aspect of this type of data storage is that it is oriented toward document-like formats and structures. It is not, however, stored in the form typical of a database. A retrieval of delta data is not possible by for example a search for changes after a certain date, global title, etc. The content of the updated documents must instead be edited manually, and the data contained therein edited by the individual network providers and checked for delta data—all of which is a laborious and time-consuming process. These same disadvantages exist in the fixed network domain, i.e. with databases in which routing data are stored. These data too are communicated to the database operators in individual documents and incorporated/updated manually in the respective databases of the network providers.

In both cases, there is no automatic synchronization of the dynamic roaming or routing data with other network operators. The manual incorporation/updating of data creates massive delays in internal and external data synchronization. Missing or noncurrent data result in degradations in quality, losses of income, and significant delays in remediating breakdowns since a search effort is always required first in order to verify the update status of the roaming data or of the routing data. The document-type use of modified data sent to the operators of other communication networks furthermore results in a significant labor cost since a manual incorporation of the updates is required.

OBJECT OF THE INVENTION

The object of this invention is therefore to provide a method of synchronizing network data, in particular roaming and/or is routing data, between two databases in order to significantly reduce the workload/expense in updating the data, to reduce the error rate caused by manual entry, to ensure that the data are up-to-date and complete, and to thereby ensure a high quality standard for services involving roaming data and routing data. In addition, the object of the invention is to employ automatic synchronization to reduce delays, errors, and labor costs in providing the data. This enables degradations in service and network interruptions to be avoided, as well as resources to be saved.

SUMMARY OF THE INVENTION

Data relevant for international roaming, such as E.164-GT, E.212 (Mobile Country Code, Mobile Network Code), E.214-MGT, Network Node GT Range, MSRN (Mobile Station Roaming Number), CAP versions, GPRS (General Packet Radio Service) data, MMS (Multimedia Messaging Service) data, billing parameters, tariffs and regions, contact persons, etc., are currently sent out by e-mail in a document format or as Excel® or Word® documents (AA.14, IR.21, etc.) This communication of data is not implemented carefully and/or promptly by the network operators. In addition, these data in the GSMA database are often incomplete data, are not kept up-to-date, or deviate from the specification in the IR.21 document.

The invention provides an approach wherein all IR (international roaming)-relevant data are exchanged between two roaming partner networks as part of a new communication relationship. From the start of this communication relationship, a logbook is maintained at least on the data-processing system of the first communication network in which logbook changes are entered that relate to the content of the local database. Based on entries in the logbook, the data-processing system recognizes in completely automatic fashion that a synchronization of data is required and implements this action between the internal network operator database and the data-processing system of the second communication network. The data-processing system can also handle the following functions:
  change history
  recognizing the communication networks to be notified
    (which are affected by the data change)
  acknowledgment function
  authorization functions (internal and external interfaces)
  format adjustment
  fallback function (distribution by e-mail in Microsoft
    Word®/Microsoft Excel® format for communication
    networks without data-processing systems or in the
    event of malfunctions)
  notification functions (process control)
  scheduled updates (future update schedule)
  "valid from" flag (information on an update taking into
    account a process-specific preliminary run)
  retry function/manual sync function (in the event of malfunctions)

The use of a logbook that is maintained on the first data-processing system has the advantage that changes can be documented regarding the content of the first database, i.e. regarding changes, revisions or deletions of data from a data record or of an entire data record, and these can be searched automatically and forwarded to other network operators as dictated by specifiable parameters. This thus provides an automatic update of the data from external network operators without performing intermediate steps manually. The high labor effort/expense incurred by manually entering the data is thereby reduced, and furthermore any sources of error caused thereby are eliminated. The services provided by the network operator can thus be enhanced significantly in terms of their quality, scope of sales, and customer-friendliness.

With regard to initializing the first database, provision can be made whereby the first database is first populated with data, although no entry is yet provided in the logbook. This fact can be taken as a prompt to forward the entire relevant content of the first database to the operators of other communication networks that belong to the partnership, and the empty logbook can indicate the first-time population of the first database with new data records. An information element about the forwarding of data can preferably be entered in the logbook. This documents the forwarding of the data to a specific network operator and the receipt of these data (acknowledgment). This type of entry can preferably be performed separately for each external network operator.

The exchange of data is implemented from a central database of the given communication network. The exchanged data relate to planning data that are already in live mode or in the planning status. This makes it possible to exclude duplication that can occur with abbreviated data, or overlap with other, in is particular national network data.

In an advantageous embodiment, the information can include specification of the forwarding time and/or specifications of the forwarded data. As a result, a clear determination can be made at a later time as to when and which data have been sent to a given external network operator. Specification of the forwarding time here can be done by a time stamp that is the basis for determining which data have already been transmitted to the specific external network operator, and which have not.

Preferably, provision can be made in the method according to the invention whereby only those data from the first database are transmitted that have been modified during an update of the first database, the determination being made as to which data have been modified after the last transmission to the second database based on the entries in the logbook according to the invention. What is achieved thereby is that only delta data are forwarded, i.e. data that have been modified from a given data content existing in the past. This avoids always transmitting all the data of a data record that can also include non-delta data.

The forwarding of the data here can be implemented at a specifiable frequency of occurrence. Provision can be made, for example where the modified data are transmitted daily to the external network operator, where the time stamp of the last forwarding can be used as the reference time. Provision can be made, alternatively or in combination, whereby data are used at one point or multiple permanently specifiable times. The times selected here could be, for example 0:00 hours of each day, or the $1^{st}$ or the $15^{th}$ of each month. In addition, alternatively or additionally, a modification of the content of the first database could prompt an automatic forwarding of the modified data. Since this forwarding of data is always effected immediately after a change in the content of the database, this approach ensures the highest level of timeliness for the data of the external database.

It is furthermore advantageous to implement the forwarding of the data in complete data records. This has the advantage that each individual change in the logbook does not have to be retained in the event of changes to multiple fields within a data record; instead what is sufficient is simply the fact of entering that data have changed within a given data record. Based on this information, the complete data record can then be sent to the external network operator and replace the out-of-date data record in the second database.

In an especially preferred development of the invention, the receipt of data can be confirmed and/or logged by the second data-processing system, and a confirmation or record is transmitted to the first data-processing system. This can ensure that the transmitted data have been received by the external network operator and that this operator has been informed of the changes made in the database content of the first database. A confirmation within this meaning can be the data that have been received. In addition, a record can furthermore have data to the effect that it contains information about which specific data have been received at which time or which protocol has been used for the communication link.

In an advantageous development, the confirmation of receipt and/or the content of the protocol/record can be entered by the first data-processing system into the logbook. As a result, receipt of the sent data by the external network operator is documented in a verifiable way and can be looked up for purposes of later verification and testing.

If the communication paths to the external network operator, and/or the second data-processing system, experience technical malfunctions, a situation may occur in which the forwarded data are not received by the external network operator. If a confirmation of receipt is not forthcoming in this case from the second data-processing system, a repeat forwarding of the data can be effected after a predetermined time interval. This time interval can start at the time that is entered by time stamp in the logbook. Selection of the time interval is arbitrary; it can be, for example one or several hours.

In an advantageous development, a send failure can be entered in the logbook after the data have been forwarded repeatedly and no confirmation of receipt has been received. This entry can send the data to be forwarded to be provided over a different communication path to the external network operator. Provision can be made here whereby after a send failure the data to be forwarded are forwarded by e-mail or fax to an administrative center managing the second database. This ensures that synchronization of the two databases is possible if the communication links between the network operators are impaired for an extended period of time.

In another advantageous variant of the invention, a change in the content of the first database can be entered in a first logbook and information relating to the forwarding of data, the receipt of confirmations of receipt, and/or protocols/records can be entered in a second logbook. This enables a logbook function to be implemented through internal data changes, by which function a synchronization of the content of the first database with the other network-internal databases of the operator of the first communication network is possible, which databases manage only partial data records that are incorporated there by individual departments of the network operator. The internal logbook can be used to synchronize the partial data records of the various department databases, which are also linked to the first data-processing system, with the first database, the partial data records being consolidated in a single data record within the first database.

Communication between the first and second data-processing systems can be implemented over an Internet-protocol-capable network.

In another advantageous variant of the method according to the invention, at regular intervals based on the database content of the first database documents can be generated in which the database contents are logged. These documents can correspond to IR.21 documents. A version number can be automatically assigned to this type of automatically generated document to provide information on the current validity of the document, for example its time of creation or whether it is up-to-date.

In an advantageous development of the invention, a message can furthermore be forwarded after synchronization of the two databases to an administrative center managing the second database. The external network operator is thereby automatically informed comprehensively about updates that have been implemented in the database.

The data provided for forwarding can furthermore be entered in a list that is forwarded as a document to the second data-processing system. This ensures backward compatibility for the external network operators that do not have a data-processing system that can receive the forwarded data, acknowledge receipt, and store this in the database of the external network operator.

In an advantageous development, the data that have changed in comparison with other data can be highlighted in the list. For the external network operator, this facilitates recognition of the delta data within the list.

According to the invention, the method of synchronizing network data, in particular roaming and/or routing data, between at least two databases can be implemented automatically by using computer software that has a computer program with software routines for carrying out the method, the program being stored in memory of the first data-processing system when the computer program and implemented on the first data-processing system. The computer program here can have software routines that are set up to execute the individual steps of the method.

In addition, other software can be provided that implements the processing of the received data, their storage in the second database, as well as the acknowledgment and recording of the receipt of the data by the external network operator. This software can have a computer program with software routines stored on a second data-processing system and set up to execute the steps of the method for to the second data-processing system when the computer program is implemented on the second data-processing system.

Another aspect of the invention is to provide a communication system to synchronize network data, in particular roaming and/or routing data, between at least first and second databases, the first database being connected to a first data-processing system associated with a first communication network, the second database being connected to a second data-processing system associated with a second communication network, the first and the second data-processing systems being connected to each other by a communication link, the first database storing network data held in data records and suitable for synchronization with the second database, where the first data-processing system has means for keeping a logbook in which changes relating to the content of the first database can be entered and the first data-processing system has means for forwarding data, the second data-processing system having means for receiving the data and means for storing the data in the second database.

BRIEF DESCRIPTION OF THE DRAWING

Additional features and advantages of the method according to the invention, and of the software according to the invention and the communication system, can be seen from the following description of illustrated embodiments.

DETAILED DESCRIPTION

Figure 1:
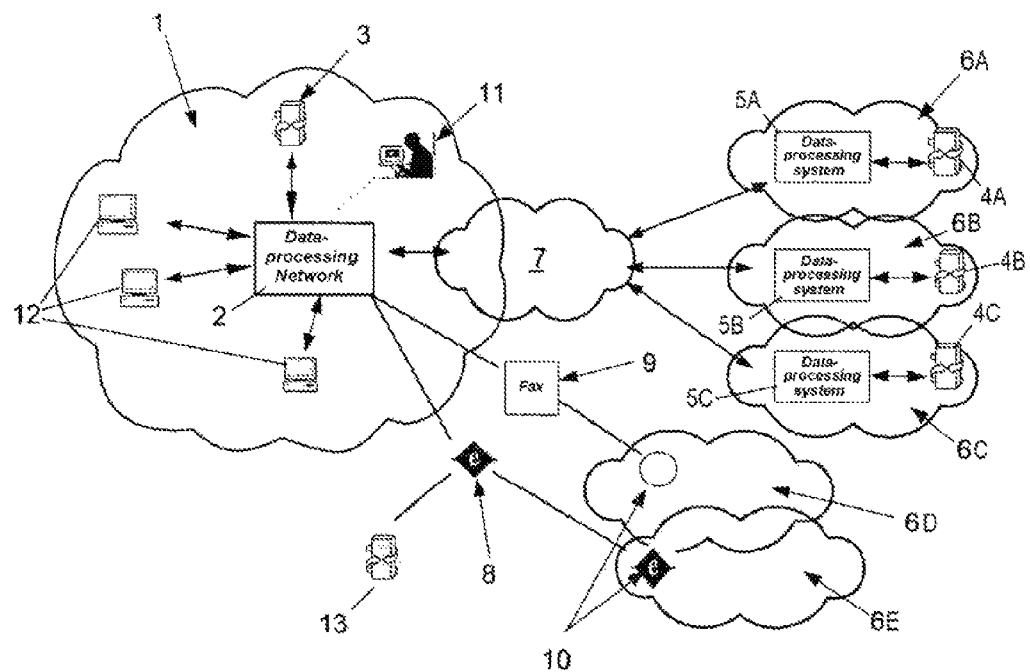
FIG. 1 is a graphic representation of the elements present in a communication link that are required to synchronize the roaming and/or routing data between two databases.
Figure 2:
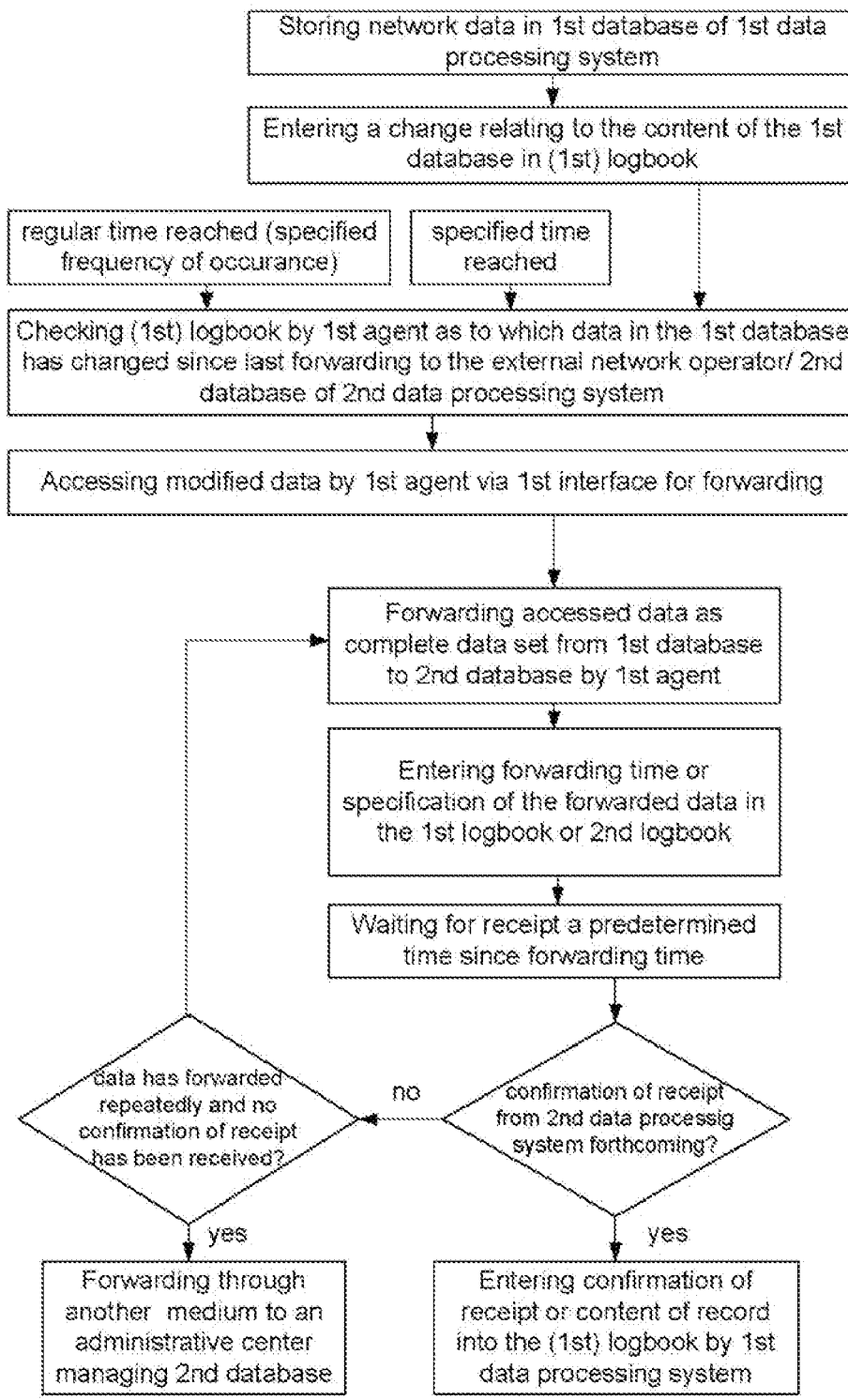
FIGS. 2-5 are flow charts illustrating the instant invention.
Figure 3:
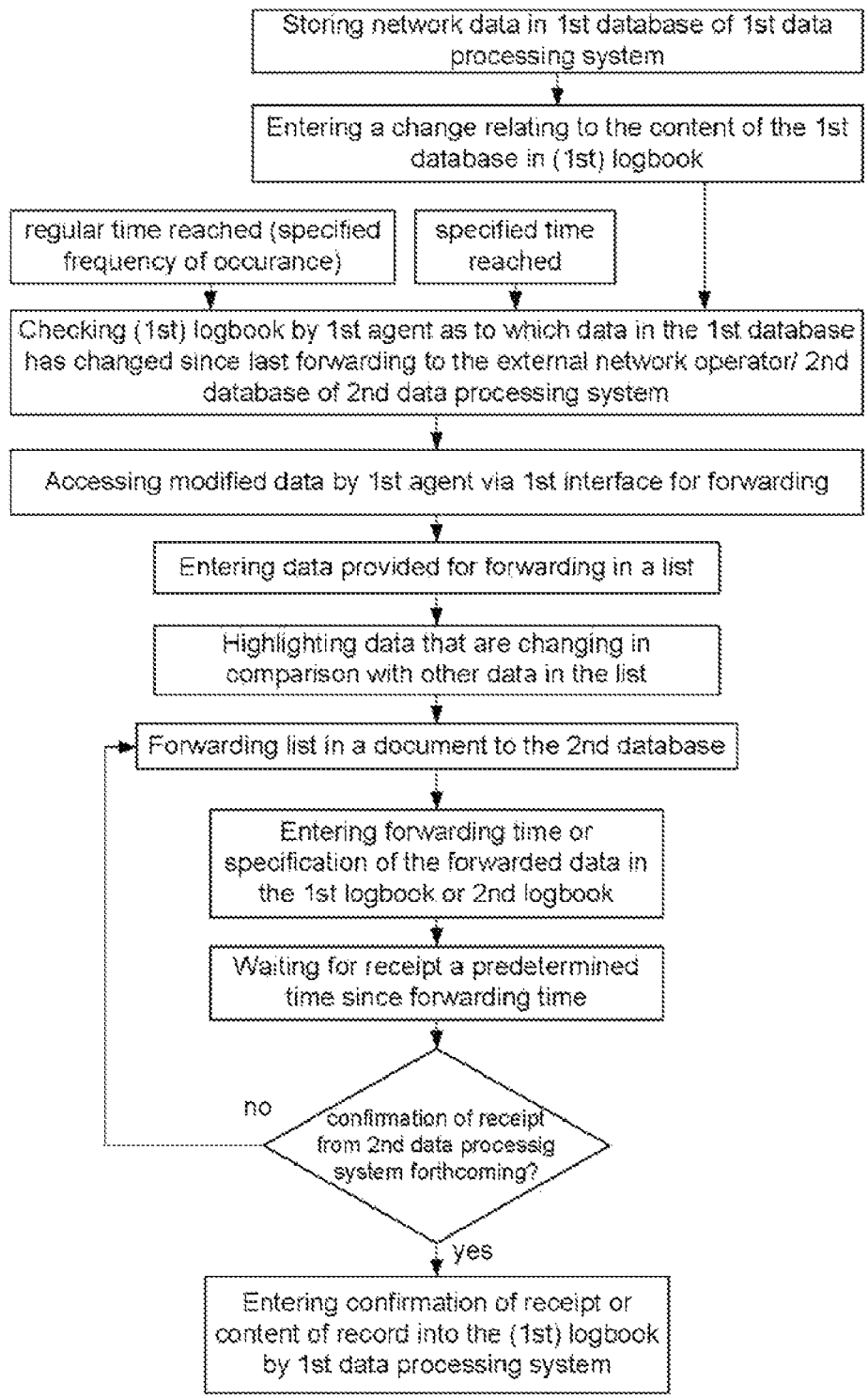
Figure 4:
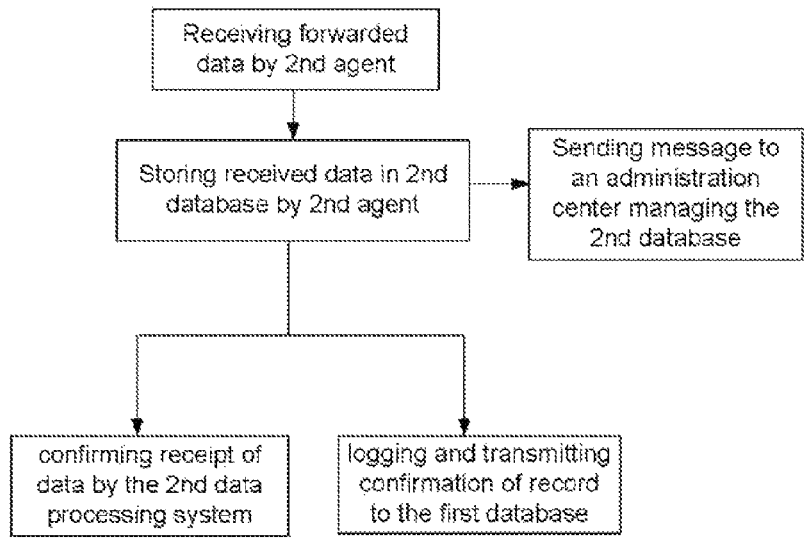
Figure 5:
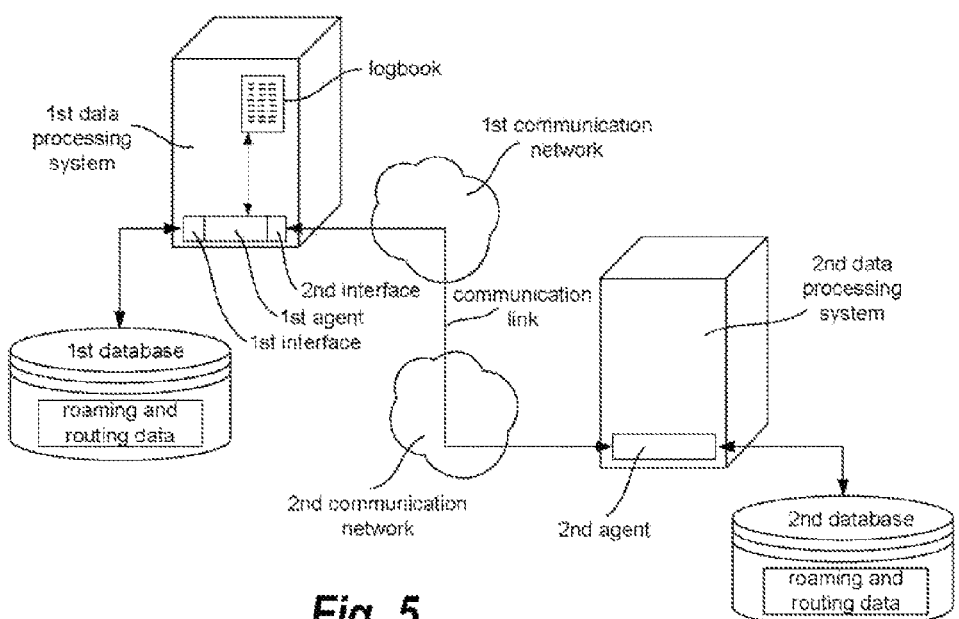

Here a first local database 3 is connected to a first data-processing system 2 that is associated with a first communication network 1. In this variant, the communication network 1 consists of a mobile radio network in which roaming data are entered in a first local database 3 from a communication terminal located in the mobile radio network, in particular a mobile telephone. Roaming data can be stored by the data-processing system 2 in the database 3 and retrieved from this database. The data-processing system 2 here is in the form of a server on which a program runs, identified subsequently as an agent, that controls the storage of data and access to data. The agent here is monitored by a program manager 11. The roaming data are supplied by various managing departments using remote input devices 12, where the departments include, in particular IT managers, Global Title managers, and SMSC (Short Message Service Center) managers. An internal synchronization of the local database 3 with up-to-date network data, which is communicated to the data-processing system 2 through input devices 12, is implemented by the agent. In addition, manual synchronization of the local database can also be implemented directly by a database manager. The internal synchronization and provision of roaming data is implemented through an adaptable internal transfer protocol.

The database 3 here can contain roaming data that relate to a communication terminal that is located in an external communication network 6A, 6B, 6C, 6D, and 6E and moves within the geographic functional range of communication network 1, and uses this network for outgoing and incoming calls and/or electronic messages.

The communication networks 6A, 6B, 6C, 6D, and 6E of other network providers also each have a data-processing system 5A, 5B, and 5C (those for networks 6D and 6E not being shown) that is connected to a respective local database 4A, 4B, and 4C (those for networks 6D and 6E not being shown) that contains roaming data through the communication terminals located in the respective external network 6A, 6B, 6C, 6D, and 6E. Data-processing systems 5A, 5B, and 5C here can also consist of servers on each of which an agent is running that in an automated fashion implements data processing, data acquisition and storage in databases 4A, 4B, and 4C. The agents here are also monitored by respective program managers, and the roaming data are supplied by various managing departments using remote input devices. Here too, an internal synchronization of the respective local database 4A, 4B, and 4C with the respective up-to-date external network data is implemented by the agent of the external network 6A, 6B, 6C, 6D, and 6E. Internal synchronization and provision of the roaming data are effected through an adaptable internal transfer protocol.

For purposes of synchronizing the databases 3 and 4A, 4B, and 4C, the first data-processing system 2 and the second data-processing system 5A, 5B, and 5C of a respective external network 6A, 6B, 6C, 6D, and 6E are linked through an international communication network 7 that in this case consists of an internet-protocol-capable network. Through this network the automatic data synchronization between the local databases 3, 4A, 4B, and 4C is effected by the data-processing systems 2, 5A, 5B, and 5C using a standardized cross-network transfer protocol.

If the database content of the database 3 is modified by one of the departments 12, where a change can include the creation of a new data record, a modification or even a deletion of an existing data record, or only the new generation, modification, or deletion of individual data in a data record, this is effected by accessing the data-processing system 2 using remote input devices 12 through the agent running on the data-processing system 2, which agent in turn controls access to the database 3. The agent thus has two interfaces. A first interface to the home network operator in order to be able to access the data located in the first database 3, and a second interface to the external network operator so that data can be sent to this network operator.

A change made to the first database 3 is entered in a logbook that is stored in a storage unit of the data-processing system 2. The logbook entry here includes the time of the change and specification of those data or data records in which changes have been made, preferably providing concrete data. The logbook thus reflects the up-to-date content of the database. When the agent accesses the logbook, it is supplied with information about the database contents. The agent can thus be called "intelligent" since it knows the status of the first database 3 at any time.

For purposes of synchronizing the database 3 with the databases 4A, 4B, and 4C, the changed data are forwarded by the data-processing system 2 through the communication network 7 to data-processing system 5A, 5B, and 5C of the external network operators. Forwarding can be based here on a list of recipients in which the recipients of the changed data along with respective addresses are recorded. The list can also be stored on the data-processing system 2.

Provision can be made whereby the changed data are is forwarded at a predetermined time, for example on the $1^{st}$ or the $15^{th}$ of each month, or daily, or at a specific time of day. Changes made before this time would be documented in the logbook in the database content of the database 3, then completed by adding a "distribution note." Alternatively, provision can be made whereby changes in the database are communicated immediately to other network operators.

For purposes of forwarding the data, the agent running on the first data-processing system 2 first checks the logbook as to which data have changed in the database 3 since the last forwarding to a given external network operator. Once these have been determined based on entries in the logbook, the agent accesses the corresponding roaming data in the database and forward these through communication link 7 to data-processing systems 5A, 5B, and 5C based on the external network operators listed in the recipient list, on which data-processing system they are received by the agent running there and stored in databases 4A, 4B, and 4C. An agent of the data-processing system 5A, 5B, and 5C acknowledges receipt and sends back a confirmation of receipt through network 7 to the agent of the first data-processing system 2. This agent preferably enters the confirmed receipt, along with a time stamp and the specific received data, in the logbook.

A logbook can also be maintained in the second data-processing system 5A, 5B, and 5C in which the agents running on the second data-processing systems in turn document the receipt along with time stamp and specification of the specific received data in a logbook. In terms of the transfer operation for the changed data, the selected transfer format can be a secure format, such as, for example SFTP.

It should be specified in each agent 2 which networks have and use an agent 5A, 5B, and 5C. In addition, any differing interfaces should be specified. Agent 2 will always select agent 5A, 5B, and 5C, where available, as the primary interface. The agent has additional interfaces by which to reach communication networks without agent through e-mail 8 or fax 9, and supply them with its data. These two options are considered to be fallback options. When forwarding its network data, agent 2 checks whether agent 5A, 5B, and 5C is active. If not, one of the fallback interfaces can be selected. The fallback interfaces can also be selected if a data transmission has not been successful.

If the agent of the first data-processing system 2 does not receive a confirmation of receipt, the send operation is repeated. Any data that have changed since the first forwarding can also be taken into account. If no confirmation of receipt is forthcoming even after a second send attempt due to ongoing malfunctions in the communication paths or at the location of the external network operator, the agent forwards the data to be forwarded by fax 9 or e-mail 8 to an administrative center 10 of the operator of the other communication network 6A, 6B, 6C, 6D, and 6E. In the case of forwarding by e-mail, the data can be stored or temporarily stored in a mail server. This ensures that the operators of the external networks are notified about changes in the database 3 and no data is lost when there are malfunctions. Instead, the first database constitutes a backup system that continues to keep the data available in the event of a malfunction (=mail server functionality).

Similarly, provision is made whereby changes in the content of database 4A, 4B, and 4C are communicated by an agent running on the second data-processing system 5A, 5B, and 5C through communication link 7 to the agent of the first data-processing system 2, which confirms receipt of the data, makes a corresponding entry in the logbook, and stores the data in the database 3. This achieves a reliable automatic exchange of roaming data, or synchronization of the databases 3 and 4A, 4B, and 4C, thereby enabling up-to-date roaming data to be provided to each network operator using the method according to the invention.

In the event of a relatively large number of updates to one of the two databases 3 or 4A, 4B, and 4C, synchronization can be done at shorter intervals of time whenever fixed time intervals have been defined for synchronization. Frequently changing data, i.e. so-called delta data, can be transmitted at a higher frequency than other data. In particular daily forwarding is recommended.

The agents running on data-processing systems 2, 5A, 5B, and 5C thus perform logbook functions and control functions relating to the transmission of data. In addition, they control authorizations, process authorization requests, and manage a change history.

One of the most important innovations of the method according to the invention is that each network operator has and uses its own agent, and the agent itself distributes the plan data and live network data to other IR partners and agent users. Each agent functions independently and autonomously.

In addition, the agent also includes, inter alia, the following specifics:

The agent is software that supports different interfaces ('SQL', 'SMNP', 'Q3', etc.) These interfaces can be used by the local operating system or local database of the network operators to effect an internal exchange of data. As a result, this software is usable for essentially all network operators.

Each network operator can use its own agent to obtain complete data or delta data from other networks.

Each network operator is itself responsible for security settings and access rights, and can freely configure them.

The exchange of data occurs in conventional formats, but also in different formats. The receiving agent can use configuration settings to exchange certain parameters with the local or its own planning database.

The agent has a logbook for acknowledging the forwarded delta data when received, or for logging the received data.

The agent has a backup for the other users, where the agent is not active for a certain span of time.

Forwarding of data to other agent users proceeds directly over IP. Forwarding to 'non-agent users' is by e-mail, or in rare cases through a fax connection.

The agent has setting options for forwarding data, such as frequency, communication authorizations and user authorizations, time, flag detection, how data have been entered for export by the agent in the specific database, type of data, other possible means of forwarding the data.

Allocation of the data of the databases into so-called cluster types (for example GPRS/IP, (M)GT-S, network element addressing GT, etc.) and assignment of internal responsibilities or accounts to manage the delta data can be provided.

The logbook function includes all internal data changes.

Compatibility with the previous method is possible by automatically generating the conventional documents (IR.21, AA.14, etc.) by automatic assignment of version numbers.

The Internet (IP) or a GRX network can be used as the international medium for exchanging data.

Preferred formats for the transmission of data are secure Internet protocols, such as for example SFTP.

Each network operator remains responsible for the data transmitted, as is also true now with entries at the GSMA. A fundamental advantage of the agent is the fact that a synchronization of data is possible virtually every day (under 'setting options'/'frequency'). This enables a large majority of the problems that occur due to delayed updates using the prior art to be avoided in the future. When an agent is engaged, all received data are acknowledged, logged, and stored in a database. In addition, an update notification can be sent to the data manager within the home network or the internal network.

The data are exchanged in individual data records and not on the basis of documents, as in the prior art, and the data can be assigned to logical domains, for example network operators, GPRS data, contact persons, or to conventional document types, for example AA.14, IR.21, IR.35, etc. Since only one update of the delta data is required, large sets of data generally do not have to be transmitted.

The IR data are forwarded to the IR partners (worldwide) based on three methods:

1. all data of the internal network
Manual, or as a special case in the configuration,
<settings data exchange>
2. only delta data from the internal network
(automatic)
3. Projected data What is intended by point 1 is complete data for new users of the agent in order to populate the new IR agent database upon startup. Other conditions as well should be considered here, for example system techniques that make it necessary to overwrite all data by new complete data.

With point 2, the delta data always relate to the last known data status according to the logbook of the specific agent user. A logbook records the last data transmissions to the user of the external agent with a time stamp, for example by IP addressing. The query in the first database 3 or in multiple decentralized databases is generated based on this time stamp of the other user and automatically launched. As a result, it is always the last and most up-to-date delta data of the live network or mobile radio network that are released, optionally including plan data for this network operator.

According to point 3, it is also possible to exchange projected data in a special database domain. Changes that have a large effect, for example new E.214-MGT, are often announced in advance and maintained in parallel with the "old" data status during an implementation period.

The method according to the invention can function as a backup solution for networks that may in fact have an agent but are temporarily unable to use it, for example in response to Internet or software malfunctions. The agent of the operator of the first communication network sends its complete data & delta data to all other agents. After multiple unsuccessful attempts, an entry is made in the above-mentioned logbook that the data of the other agent have not been received. In this case, a specified time factor ensures that the data are sent as an e-mail message or fax to the contact persons of the IR partner network, generally the agent manager.

The distribution of synchronization data for IR partners that do not have and thus do not use any agent can be implemented by e-mail. The data of the internal plan network or live network in these cases are to be transmitted by the agent in a Microsoft Excel® list or Microsoft Word® document. The current document format (for example IR.21 format) can be used as the model here. The agent manager uses the internal logbook, which contains existing internal changes by the manager for all information clusters, whether an update should be sent to the roaming partners. An Excel® list is the preferred approach since this enables technical data to be mapped more efficiently and facilitates the transfer of the data in the databases.

The agent automatically assigns the new version number of the specific document, updates the date of the document, marks the delta data, and uses the recipient list to forward it to the roaming partners, non-agent users, and optionally to the GSMA database. The type for forwarding used is preferably e-mail messages; faxing can also be selected as an option.

The above-mentioned deficiencies, as well as the advantages that can be achieved by using an agent to exchange planning data, also apply to the international fixed network domain. Here too, data are currently incorporated/updated and exchanged in similar fashion. This also results in the above-mentioned disadvantages of this type of method.

The use of an agent for the automatic synchronization of planning data thus constitutes a universal and innovative instrument that can be used in the domain of "international exchanges of dynamic configuration data." A need for this exists both in the mobile domain and also in the fixed network domain. In light of the anticipated higher sales revenue and also the declining requirement for resources to organize and maintain the IR-relevant network data, agents will quickly be adopted more widely by network operators.

Even in the case of relatively low-level agent availability, it is possible to achieve a significant added value. This added value results in an enormous reduction in costs for network planning, a significant increase in quality and sales in the roaming and SMS interacting domains by real-time implementation, and remediation of degradations in service due to missing configuration data, as well as in a reduction in errors due to automatic data processing, since neither manual acquisition of data nor further processing of data are required.

Due to the implicit multiplier effect of the "platform solution" according to the invention, the added value will increase many times over once a critical mass has been achieved.

The invention claimed is:

1. A method of synchronizing network data for automatically updating the data of external network operators with roaming or routing data, between at least a first database connected to a first data-processing system associated with a first communication network and a second database connected to a second data-processing system associated with a second communication network and connected to the first data-processing system by a communication link, the method comprising the steps of:
storing in the first database network data held in data record sets and suitable for synchronization with the second database,
providing each of the first and second data-processing systems with a respective program operating as respective first and second agents independently and autonomously to control data access and data storage in the respective databases to carry out an internal synchronization of the respective databases with up-to-date network data,
providing the first agent with a first interface for accessing data in the first database and a second interface to an external network operator for sending data to this external operator;
maintaining a logbook on the first data-processing system in which changes relating to the content of the first database are entered, and
depending on a logbook entry transmitting data reflecting a change of at least one data record set from the first data-processing system to the second data-processing system by
the first agent first checking the logbook as to which data in the first database has changed since the last forwarding to the external network operator,
accessing the data in the first database via the first interface by the first agent,
forwarding the accessed data by the first agent via the second interface through the communication link to the second data-processing system,
receiving the forwarded data by the second agent, and
storing the received data by the second agent in the second database.

2. The method according to claim 1, wherein data relating to the forwarding of data is entered in the logbook.

3. The method according to claim 2, wherein the information element includes the forwarding time or specifications of the forwarded data.

4. The method according to claim 1, wherein only those data from the first database are transmitted that have been modified when updating this database, a determination being made based on the entries in the logbook as to which data have been modified after the last transmission to the second database.

5. The method according to claim 1, wherein the forwarding is effected at a specifiable frequency of occurrence at one or more specifiable times or immediately after a change in the content of the first database.

6. The method according to claim 1, wherein the data is forwarded as complete record sets.

7. The method according to claim 1, wherein the receipt of data is confirmed by the second data-processing system or is logged and a confirmation or record is transmitted to the first data-processing system.

8. The method according to claim 7, wherein the confirmation of receipt or the content of the record is entered into the logbook by the first data-processing system.

9. The method according to claim 1, wherein a repeat forwarding of the data is effected after a predetermined time interval whenever a confirmation of receipt from the second data-processing system is not forthcoming.

10. The method according to claim 9, wherein the start of the time interval is determined based on the time entered in the logbook for the forwarding of the data previously transmitted to the second data-processing system.

11. The method according to claims 9, wherein a send failure is entered in the logbook after the data has been forwarded repeatedly and no confirmation of receipt has been received, the data to be forwarded then being forwarded through another medium, in particular e-mail or fax, to an administrative center managing the second database.

12. The method according to claim 1, wherein a modification of the content of the first database is entered in a first logbook, and the forwarding of data or receipt of a confirmation of receipt or records of forwarded data are entered in a second logbook.

13. The method according to claim 1, wherein at regular intervals documents are generated in which the contents of the first database are logged.

14. The method according to claim 1, wherein a message is sent to an administrative center managing the second database after the databases have been synchronized.

15. The method according to claim 1, wherein the data provided for forwarding are entered in a list that is forwarded in a document to the second data-processing system.

16. The method according to claim 15, wherein the data that are changing in comparison with other data are highlighted in the list.

* * * * *